(12) United States Patent
Birk et al.

(10) Patent No.: US 7,654,132 B2
(45) Date of Patent: Feb. 2, 2010

(54) METHOD AND APPARATUS FOR INDIRECTLY ASCERTAINING THE CYLINDER PRESSURE IN PISTON ENGINES

(75) Inventors: Manfred Birk, Oberriexingen (DE); Michael Kessler, Weissach (DE); Martin Buchholz, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 11/807,241

(22) Filed: May 25, 2007

(65) Prior Publication Data

US 2007/0277601 A1    Dec. 6, 2007

(30) Foreign Application Priority Data

May 31, 2006    (DE) .................. 10 2006 025 333
Aug. 10, 2006    (DE) .................. 10 2006 037 398

(51) Int. Cl.
    *G01M 15/08*    (2006.01)
(52) U.S. Cl. ................................... 73/114.16
(58) Field of Classification Search ............... 73/114.6, 73/114.17, 114.18, 114.22, 114.23
    See application file for complete search history.

(56) References Cited

U.S. PATENT DOCUMENTS

| 5,782,213 A * | 7/1998 | Pedersen .................... 123/55.2 |
| 6,684,690 B2* | 2/2004 | Mairhofer ................ 73/114.81 |
| 7,117,726 B1* | 10/2006 | Krieger ................... 73/114.18 |
| 2003/0209219 A1* | 11/2003 | Klomp et al. ............ 123/197.4 |
| 2007/0137606 A1* | 6/2007 | Takahashi et al. ....... 123/195 R |

\* cited by examiner

*Primary Examiner*—Eric S McCall
(74) *Attorney, Agent, or Firm*—Ronald E. Greigg

(57) ABSTRACT

In a method for indirectly ascertaining the cylinder pressure during the operation of piston engines by measuring cylinder pressure-dependent parameters at crankshaft bearings of the piston engine, one essential feature is that the force which is introduced by the main bearings of the crankshaft into an engine housing is measured. For performing the method, sensors for obtaining cylinder pressure-correlating signals are disposed on the bearing screws, and that the signals generated by the sensors are carried to the outside.

20 Claims, 2 Drawing Sheets

METHOD AND APPARATUS FOR INDIRECTLY ASCERTAINING THE CYLINDER PRESSURE IN PISTON ENGINES

CROSS REFERENCE TO RELATED APPLICATIONS

This application is based on German Patent Application Nos. 10 2006 025 333.7 filed 31 May 2006 and 10 2006 037 398.7 filed 10 Aug. 2006, upon which priority is claimed.

BACKGROUND OF THE INVENTION

1. Field of the Invention

The invention relates to a method of and apparatus for ascertaining the cylinder pressure in an internal combustion engine during operation of the engine.

2. Description of the Prior Art

Modern combustion processes for instance homogeneous or partly homogeneous combustion processes, of the kind known in diesel engines require the most accurate possible knowledge of the course of the pressure in the work chamber of the applicable cylinder. The cylinder pressure is determined by parameters that individually describe the characteristics of the combustion process. Often, these combustion processes prove very vulnerable to altered conditions, such as conditions in the injection quantity or the air mass or the proportion of the recirculated exhaust gas. To achieve the required stability of the combustion process, pure open-loop control itself is therefore inadequate. Instead, stable operation of the combustion processes in question must be attained by closed-loop control or regulation, in closed control loops. This is possible with the aid of suitable information about the course of combustion.

Independently of the regulation of modern combustion processes, abnormal combustion processes (such as knocking in Otto engines, or misfires) can also be detected by ascertaining the pressure course. With the aid of the ascertained cylinder pressure, further fundamental conclusions for regulating or controlling the engine and diagnosing it can also be drawn. Consequently, the pressure course is an important basic variable.

For pressure measurement, it is known to use special invasive pressure sensors, which are either combined with spark plugs or glow plugs or are additionally built into the engine. This involves direct ascertainment of the course of the cylinder pressure. The disadvantages are the comparatively great effort and high costs involved. The sensors are additionally exposed to severe stresses in the combustion chamber.

Alternative measuring methods for ascertaining the course of the cylinder pressure make use of special ring sensors, which are screwed into the spark plug conduit (see European Patent Disclosure EP 0621470) or which propose the use of capacitive travel sensors on engine components (see German Patent Disclosure DE 19803470). While the method of EP 0621470 involves a direct pressure measurement method, in DE 19803470 the cylinder pressure is ascertained indirectly (via the changes in capacitance of the travel sensors).

The disadvantages of the two above-mentioned known measuring methods is that one sensor per cylinder is needed; a signal with further influences superimposed on it must be expected (the method of DE 19803470), the sensitivity is poor, or among other factors maintenance is made more difficult.

In an indirect measuring method, which has become known from German Patent Disclosure DE 10327147 A1, for ascertaining the course of the cylinder pressure the expansion of the outer cylinder wall is supposed to be measured with the aid of strain gauges. A disadvantage of this method is that the cooling conduits that often extend between the inner and outer cylinder walls lessen the measurement effect, and for each cylinder to be sensed, a separate sensor of its own must be used. Measuring the expansion at the outer cylinder wall moreover requires that the suitable positions at the engine be available and not occupied by attached parts, or that the expansion field is unimpeded by receptacles, cast integrally onto the engine, for additional devices. These prerequisites are met only rarely in practice, given the tight spatial conditions as a rule in the engine compartment of motor vehicles. Moreover—especially in view of new engine constructions— it is in no way certain that a fundamentally sufficient expansion amplitude will be available on the sidewall of the engine. Basically, applying sensors for strain measurement on the sidewall of the engine is complicated and as a rule requires modification both of the cast engine block and of its machine. Sensors disposed there are necessarily exposed to environmental factors. A primary example that can be named here is corrosion of the interface with the engine that is decisive for transmitting the signal and consequently for the sensor output signal.

From German Patent Disclosure DE 10108051, it is also known to indirectly ascertain the course of the cylinder pressure by measurements of expansions and changes in travel of the cylinder pressure screws. A disadvantage here is the limited installation space in the cylinder head as well as the major thermal stress. In addition, it must be expected that because of the immediate vicinity of strong sources of structure-borne sound (valve operation, impacts of the valve plate, valve motion, interference from injectors), interference in the output signal will be caused.

Finally, from German Patent DE 3933947 C1, an indirect measurement method for determining the combustion pressure in reciprocating piston engines has become known which is based on the provision of measuring accelerations at each crankshaft bearing of the engine and from that drawing a conclusion about the course of the combustion pressure. For this purpose, piezoelectric acceleration sensors mounted on the crankshaft are said to be used. The disadvantage is that the acceleration values furnished by the sensors must first be converted into the force conditions that actually pertain.

OBJECT AND SUMMARY OF THE INVENTION

The object of the present invention is to create an indirect measurement method for ongoing ascertainment of the course of pressure in piston engines which avoids the above-described disadvantages of known measurement methods and assures the secure attainment of an exact signal that correlates with the cylinder pressure at least in the range of the high-pressure phase of the cylinder.

An essential special feature of the invention is accordingly the measurement of the force that is introduced by each of the main bearings of the crankshaft of the piston engine into the engine housing (engine block). The invention is not limited to piston internal combustion engines of the Otto or diesel engine types; on the contrary, it can be employed universally in piston engines. The signal that can be generated with the method of the invention and the apparatus of the invention proposed for performing the method can be used in manifold ways, for instance for calculating characteristics for combustion regulation and for engine monitoring.

In detail, the following advantages are attainable by the invention:

Installation of the sensors inside the engine in the crank chamber at existing fixation points of the engine (screw of the respective crankshaft main bearings);

Since the sensors are located directly in the flow of force, high amplitudes and hence clear signals are the result;

The full force through the gas pressure in the cylinder must be transmitted at the aforementioned screw, regardless of the engine construction and of attached parts. As a result, there is no need to search for and optimize the attachment site (which often proves problematic in other methods). This makes for savings in terms of costs and time;

All the sensors of an engine can be manufactured together for that engine type (a single component) and assembled and jointly connected as one part at the vehicle or engine factory, with the advantageous consequences of reduced cost and security against mistakes;

The possibility exists of combining the sensors with an oil quality and/or temperature sensor, which again means reduced cost;

Because of the great distance of the sensors of the invention from mechanical interference sources in the region of the cylinder head (valve motion, valve impacts, injection system, piston tilting), a favorable ratio of signal to interference is obtained;

The attachment sites contemplated according to the invention are not subject to any restrictions whatever from attached parts and the like, of the kind that exist for instance on the side wall of the engine;

There is no transmission of the signal from friction lock as is the case in the known installation of strain sensors on the side wall of the engine. This accordingly eliminates the risk of surface wear and an attendant drop in the signal;

It is possible to employ the invention regardless of the type of engine construction; and The invention makes monitoring and plausibility checking possible with one (or more) additional sensors.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
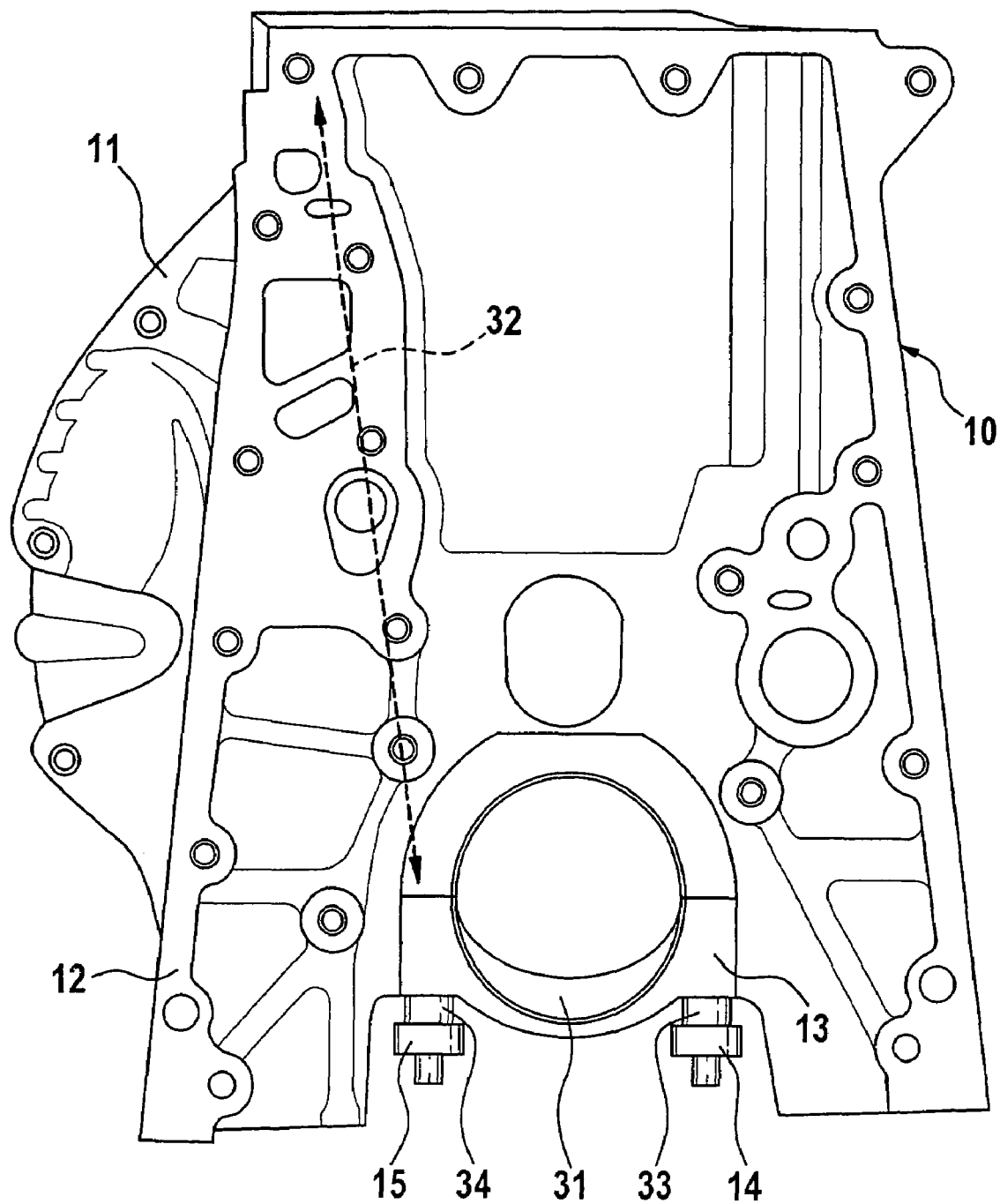
FIG. 1 is a sectional view showing one embodiment of an engine block of a piston internal combustion engine, seen from the side of the camshaft drive.
Figure 2:
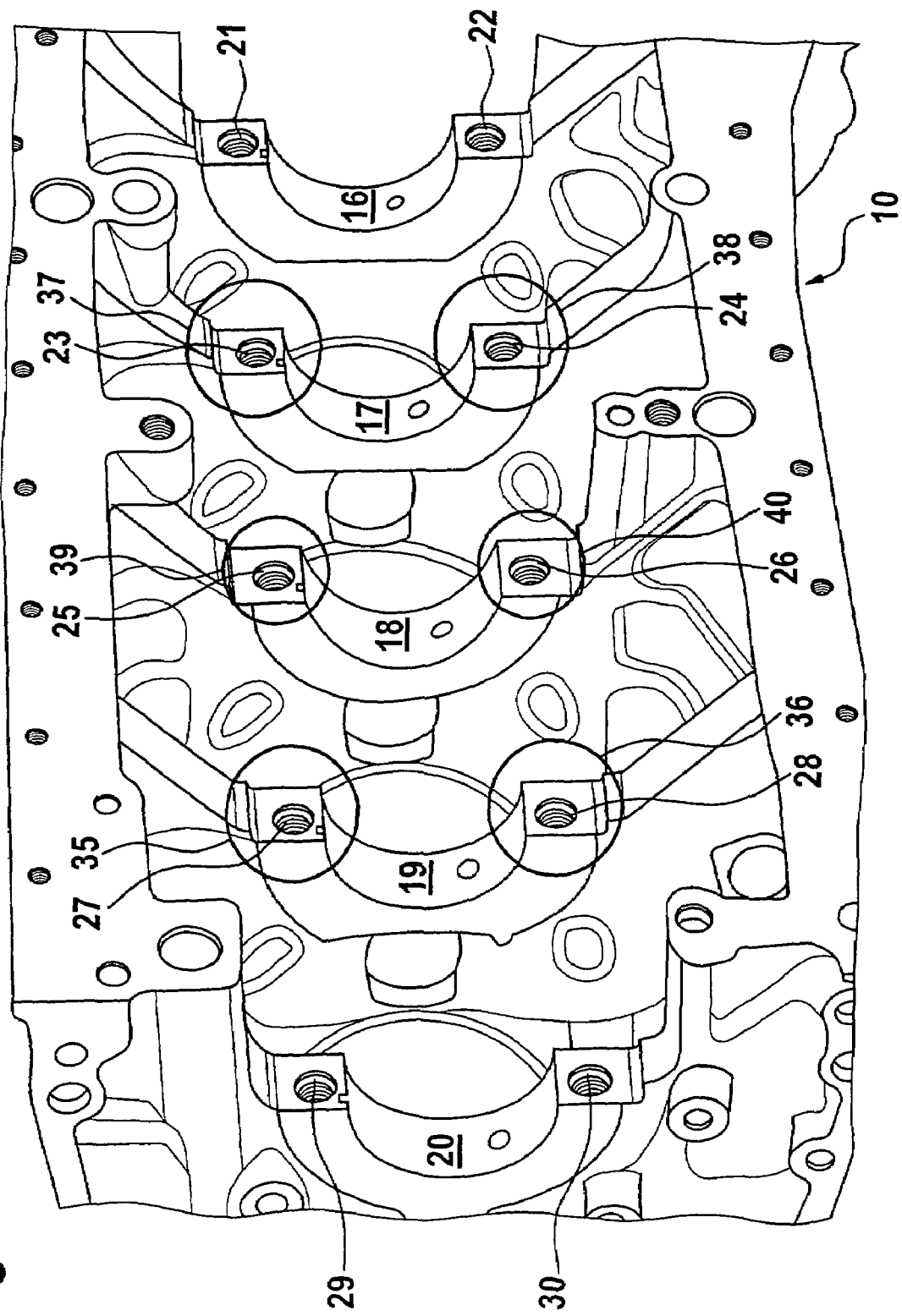
FIG. 2 shows the engine block of FIG. 1 from the front (obliquely), looking from below at the crankcase.

Reference numeral 10 overall identifies an engine block of a four-cylinder piston internal combustion engine for motor vehicles. In FIG. 1, the part of the engine block that is adjoined at the back by a gearbox 11 can be seen. The part of the engine block 10 that forms the crankcase is marked 12. A cylinder head, adjoining the engine block 10 (of FIG. 1) at the top and screwed together with it is not shown. In FIG. 1, a lower bearing cap 13 of a main bearing of a crankshaft (not shown) can also be seen. The bearing cap 13 is connected to the upper part of the crankcase (see FIG. 2) by two—schematically indicated—main bearing screws 14, 15. In FIG. 2, the upper halves of a total of five crankshaft slide bearing halves 16-20 of the crankshaft main bearing can be seen. On both sides of each of the slide bearing halves (16-20), one female thread each, 21, 22; 23, 24; 25, 26; 27, 28; and 29, 30 is machined in, and each thread cooperates with a respective main bearing screw (such as 14, 15 in FIG. 1) for the sake of retention of the bearing cap 13—which can be seen in FIG. 1 but is not shown in FIG. 2. The bearing cap 13 includes lower slide bearing halves (such as 31 in FIG. 1), which correspondingly supplement the upper slide bearing halves 16-20 (FIG. 2).

The volume of gas enclosed in the work chamber of each cylinder of the piston internal combustion engine exerts a pressure-proportional force on the surrounding components. The forces that are relevant here are those that are exerted on the piston and the cylinder head. These forces are of equal magnitude but have different signs. The force path is closed by way of the following engine components: cylinder head-cylinder head screw-engine block-crankshaft main bearing-lower part of the crankshaft bearing-crankshaft-connecting rod-piston. Consequently, a tensile stress, which is dependent on the pressure in the cylinder, is introduced into the screws—such as 14, 15 (FIG. 1)—of the crankshaft main bearing.

A double arrow 32 shown in dashed lines in FIG. 1 marks the direction of the flow of force introduced by the cylinder head screws (not shown) into the crankshaft main bearing screw 14 during engine operation. (Corresponding forces also act on the other crankshaft main bearing screw 15, and naturally also on the main bearing screws (not shown) that engage the female threads (21-30) of the other screw connections.) As a result, a tensile stress, which is dependent on the pressure prevailing in each associated cylinder and is proportional to it, is built up.

One essential special feature here is that—in terms of the exemplary embodiment of FIG. 1—the crankshaft main bearing screws 14, 15 are each assigned a respective sensor 33 and 34, respectively, which has the task of detecting the (tensile) forces acting on the applicable crankshaft main bearing screw 14, 15, converting them into proportion signals, and carrying them on to a central detection and assessment point (not shown).

In the embodiment of FIG. 1, the sensors 33, 34 are each located between the head of the associated main bearing screw 14 and 15, respectively, and the associated flange of the lower bearing cap 13. These are alternative attachment positions of the sensors. In other words, in principle, it would already suffice to provide a sensor (33 or 34) on only one of the two main bearing screws (14 or 15).

It is furthermore true that the tensile stresses of the adjacent cylinders of the piston engine are superimposed on one another. Because of this fact, the tensile stress at one screw—such as 14 or 15 in FIG. 1—includes components from both adjacent cylinders (or at the ends of the engine, only one cylinder each). Since the adjacent cylinders do not pass through the high-pressure phase simultaneously, the tensile stresses detected by the sensors (such as 33 or 34 in FIG. 1) can be associated with the individual cylinders and thus separated in the signal processing. This is especially true in the region of top dead center or the onset of combustion. Precisely in this portion of the high-pressure phase, the characteristics that are decisive in terms of combustion regulation can be calculated (such as the combustion position). Since the full force introduced by the cylinder head into the engine block (10) is transmitted at the affected screw (such 14 or 15) of the crankshaft bearing, the measurement signal output by the sensor (such as 33 or 34), or the (tensile) force corresponding to it, is not dependent on the construction of the engine block or on attached parts. From the above, it can be seen that—depending on the number of cylinders of the engine— individual, independent sensors can be used for detecting two cylinders each. If the engine involved has four cylinders, then two sensors—for instance—may be provided, while for a six-cylinder engine, three sensors can expediently be provided.

Regardless of the number of cylinders, it is also conceivable to combine a plurality of sensors into a unit. (In engines with an odd number of cylinders, this is also possible. However, with three cylinders, for instance, two sensors must be provided, and with five cylinders, three sensors must be provided.)

A sensor unit of this kind could include the sensors, the cabling, and the leadthrough to the outside together with the plug connection. The sensor unit could be installed as a molded part simply as the engine is being manufactured and can furthermore be installed in a way that is secure against mistakes. The leadthrough could be provided between the engine block (10) and the oil pan (not shown); the sealing function could be realized by the oil pan seal or by a seal that is integrated with the sensor cable/plug.

Examples of possible attachment sites of sensors can be seen in FIG. 2. For instance, sensors (not shown) can be installed either at the places marked with circles 35, 36 (in the region of the threaded bores 27, 28) or by circles 37, 38 (in the region of the threaded bores 23, 24). Here the sensors at the locations 35, 36 detect the pressure forces of cylinders 1 and 2, while the sensors at locations 37, 38 are responsible for detecting the pressure forces of cylinders 3 and 4.

By mounting one additional sensor at one of the places (threaded bores 25 and/or 26) marked by circles 39, 40, it becomes possible to obtain a redundant signal for the pressure forces generated by cylinders 2 and 3, in combination with the signals that originate at the adjacent locations 35, 36 and 37, 38, respectively. With the aid of this additional signal, the signals of the main sensors can be plausibility-checked and monitored.

With regard to the measurement principle and the construction of the sensors per se, several possibilities are fundamentally available: Among others, strain gauges, piezoelectric ceramics, and capacitive pickups can be considered. The sensors may for instance, as seen in FIG. 1 (see reference numerals 33, 34) be conceived of in the form of shims beneath the applicable screws (14, 15) of the crankshaft main bearing, or they can be integrated into the screws themselves.

The foregoing relates to preferred exemplary embodiments of the invention, it being understood that other variants and embodiments thereof are possible within the spirit and scope of the invention, the latter being defined by the appended claims.

We claim:

1. A method for indirectly ascertaining cylinder pressure during the operation of piston internal combustion engines, by measuring cylinder pressure-dependent parameters at crankshaft bearings of the piston engine, the method comprising measuring a force which is introduced at the main bearings of the crankshaft into an engine block, the force being dependent on the cylinder pressure, whereby the cylinder pressure is indirectly ascertained in dependence upon the measured force which is introduced at the main bearings of the crankshaft into the engine block.

2. The method as defined by claim 1, wherein the force, which is exerted by the crankshaft on respective crankshaft main bearings is ascertained at a respective main bearing screw associated with each crankshaft main bearing.

3. An apparatus for performing the method as defined by claim 2, the apparatus comprising sensors disposed on the main bearing screws for obtaining cylinder pressure-correlating signals, and means for carrying the signals generated by the sensors to the outside of the engine.

4. The apparatus as defined by claim 3, wherein the means for carrying the signals generated by the sensors to the outside comprises a cable leadthrough, a radio communication, or a plug connection.

5. The apparatus as defined by claim 3, wherein one sensor each is disposed on the main bearing screw of the respective crankshaft main bearing located between two adjacent cylinders.

6. The apparatus as defined by claim 4, wherein one sensor each is disposed on the main bearing screw of the respective crankshaft main bearing located between two adjacent cylinders.

7. The apparatus as defined by claim 5, comprising individual, mutually independent sensors for detecting the pressure of two adjacent cylinders each.

8. The apparatus as defined by claim 6, comprising individual, mutually independent sensors for detecting the pressure of two adjacent cylinders each.

9. The apparatus as defined by claim 5, wherein the sensors provided for detecting the pressure of two adjacent cylinders each are connected.

10. The apparatus as defined by claim 6, wherein the sensors provided for detecting the pressure of two adjacent cylinders each are connected.

11. The apparatus as defined by claim 9, wherein the sensors provided for detecting the pressure of two adjacent cylinders are connected by cabling and a leadthrough to the outside of the engine.

12. The apparatus as defined by claim 10, wherein the sensors provided for detecting the pressure of two adjacent cylinders are connected by cabling and a leadthrough to the outside of the engine.

13. The apparatus as defined by claim 3, wherein the sensors are each embodied as a shim disposed beneath the screw of the respective crankshaft main bearing.

14. The apparatus as defined by claim 4, wherein the sensors are each embodied as a shim disposed beneath the screw of the respective crankshaft main bearing.

15. The apparatus as defined by claim 5, wherein the sensors are each embodied as a shim disposed beneath the screw of the respective crankshaft main bearing.

16. The apparatus as defined by claim 3, wherein the sensors disposed on the main bearing screws are each integrated into an associated screw of the crankshaft main bearing.

17. The apparatus as defined by claim 4, wherein the sensors disposed on the main bearing screws are each integrated into an associated screw of the crankshaft main bearing.

18. The apparatus as defined by claim 5, wherein the sensors disposed on the main bearing screws are each integrated into an associated screw of the crankshaft main bearing.

19. The apparatus as defined by claim 3, wherein the sensors are embodied as strain gauges or piezoelectric ceramics or capacitive pickups.

20. The apparatus as defined by claim 4, wherein the sensors are embodied as strain gauges or piezoelectric ceramics or capacitive pickups.

* * * * *